US012712102B2

(12) United States Patent
Bauer et al.

(10) Patent No.: US 12,712,102 B2
(45) Date of Patent: Aug. 18, 2026

(54) METHOD FOR VARIABLY ADJUSTING THE ELECTRICAL INSULATING PROPERTIES OF VARISTOR-CONTAINING MATERIALS

(71) Applicant: MERCK PATENT GMBH, Darmstadt (DE)

(72) Inventors: Johann Bauer, Darmstadt (DE); Tanja Delp, Darmstadt (DE)

(73) Assignee: SUSONITY COMMERCIAL GMBH, Gernsheim (DE)

(*) Notice: Subject to any disclaimer, the term of this patent is extended or adjusted under 35 U.S.C. 154(b) by 583 days.

(21) Appl. No.: 18/036,841

(22) PCT Filed: Nov. 12, 2021

(86) PCT No.: PCT/EP2021/081454
§ 371 (c)(1),
(2) Date: May 12, 2023

(87) PCT Pub. No.: WO2022/101374
PCT Pub. Date: May 19, 2022

(65) Prior Publication Data

US 2023/0407052 A1 Dec. 21, 2023

(30) Foreign Application Priority Data

Nov. 16, 2020 (EP) .................................... 20207842

(51) Int. Cl.

| | |
|---|---|
| ***H01C 7/102*** | (2006.01) |
| ***C08K 9/02*** | (2006.01) |
| ***H01C 7/10*** | (2006.01) |
| ***H01C 7/115*** | (2006.01) |
| ***H01C 17/065*** | (2006.01) |

(52) U.S. Cl.
CPC ............... *H01C 7/102* (2013.01); *C08K 9/02* (2013.01); *H01C 7/1006* (2013.01); *H01C 7/115* (2013.01); *H01C 17/06586* (2013.01); *C08K 2201/001* (2013.01); *C08K 2201/005* (2013.01); *C08K 2201/014* (2013.01); *H01C 17/06533* (2013.01)

(58) Field of Classification Search
CPC ............... C08K 9/02; C08K 2201/001; C08K 2201/005; C08K 2201/014; H01C 7/1006; H01C 7/102; H01C 7/105; H01C 7/115; H01C 17/06533; H01C 17/06586; C08L 83/04
See application file for complete search history.

(56) References Cited

U.S. PATENT DOCUMENTS

| | | | |
|---|---|---|---|
| 4,726,991 | A | 2/1988 | Hyatt et al. |
| 7,651,636 | B2 | 1/2010 | Gramespacher et al. |
| 9,208,931 | B2 | 12/2015 | Kosowsky et al. |
| 2023/0018717 | A1 | 1/2023 | Bauer et al. |

FOREIGN PATENT DOCUMENTS

| | | |
|---|---|---|
| WO | 2021105319 A1 | 6/2021 |

OTHER PUBLICATIONS

International Search report PCT/EP2021/081454 dated Feb. 14, 2022 (pp. 1-2).

*Primary Examiner* — Gerard Higgins
(74) *Attorney, Agent, or Firm* — MILLEN, WHITE, ZELANO & BRANIGAN, P.C.; Csaba Henter

(57) ABSTRACT

The present invention relates to a process for the variable adjustment of the electrical insulation properties of varistor-containing composite materials with the aid of defined filler mixtures, to the use of such filler mixtures, and to composite materials having resistive and capacitive field-control properties comprising filler mixtures of this type.

21 Claims, 4 Drawing Sheets

METHOD FOR VARIABLY ADJUSTING THE ELECTRICAL INSULATING PROPERTIES OF VARISTOR-CONTAINING MATERIALS

The present invention relates to a process for the variable adjustment of the electrical insulation properties of varistor-containing composite materials with the aid of defined filler mixtures, to the use of such filler mixtures, and to composite materials having resistive and capacitive field-control properties comprising filler mixtures of this type.

Varistor fillers are employed for the production of field-controlling insulation composites based on polymers. Particulate fillers which comprise or consist of silicon carbide or zinc oxide have already been used as varistor fillers in polymers for a long time. In the meantime, however, particles of titanium carbide, titanium suboxide (preferably TiO) or also electrically conductive particles of copper or carbon black are also being introduced into various polymer systems in order to generate field-controlling properties therein.

As polymer matrix, use is made of various systems in the form of coatings or moulding compositions which consist, for example, of silicones, EPDM (ethylene-propylene-diene monomer), polyurethanes, polyethylenes, epoxides or phenolic resins.

The aim of the use of functional fillers is controlled field control or also overvoltage protection in the application medium.

The functional fillers employed for this purpose are also known as varistors ("variable"+"resistor"). They are characterised in that their electrical conductivity in the application medium is dependent on the applied field strength, i.e. occurs in a nonlinear manner.

Such fillers are particularly suitable for use in application media and for protection of the materials used there, in which high constant or variable field strengths occur.

Typical areas of use here are field control in high-voltage cables, for the connection of which to one another, for example in muffs or also at terminals, the main insulation is removed and large field-strength gradients (electrical stress) build up at the interfaces of electrically conductive and insulating components, or alternatively also for overvoltage protection against transient loads, such as switching voltages, lightning strikes or discharges. Further areas of use also consist in the field control of encapsulation compositions and contacts of circuits in high-power electronics.

Polymeric application media filled with varistor materials exhibit both properties of resistive field control and also of capacitive field control. These materials are therefore suitable both for use in direct-voltage applications and also in alternating-voltage applications and are also able to absorb transient events (pulses). The reason for this lies in a well-controlled drop in voltage between the high-voltage source (for example conductors in a cable) and the earth (for example outer conductor) via the varistor-filled application medium. Owing to the nonlinear electrical properties of the varistor material (conductivity) and its slightly increased dielectric constant at the same time as low loss (tan 67), the electric field is homogenised (resistive and capacitive field control).

The varistor fillers known today are distinguished by having a certain characteristic-line shape (E/J diagram or also E/ρ diagram) in the application medium, either specifically (ZnO, $SnO_2$, TiO) or randomly (SiC), depending on the type of synthesis, which can only be shifted to a limited extent by a change in the concentration of this filler in the application medium, since this would frequently also shift a number of other parameters. Thus, if it is intended to change the electrical conductivity of a composite material by a change in the concentration of the respective varistor filler, the switching point of the composite material also changes. If, for example, the specific resistance of the composite material (ρ) drops with increasing degree of filling (percolation effect), the switching point simultaneously moves to lower field strengths (E) in an undesired manner, i.e. the electrical strength decreases in the sense of an "insulation strength" of the composite material.

A high degree of filling with varistor fillers in polymers can, just as generally also with other fillers, lead to difficulties in the mechanical strength of such composite materials. Such highly filled polymer materials become brittle and are no longer sufficiently resistant to mechanical pressure. It would therefore be advantageous to be able to restrict the degree of filling of polymer materials with fillers in general and in particular with varistor fillers to a tolerable extent without endangering the mechanical strength of the corresponding composite materials or making the discharge ability of the material too low. In addition, it would be advantageous to be able to adjust the specific resistance of composite materials variably in relation to the respective requirements of the application medium. In addition, it is necessary for the corresponding fillers to be homogeneously distributed in the polymer matrix in order that local differences in the dissipation ability of the material do not occur in the application medium.

With respect to optimum homogeneous distribution of varistor fillers in the polymer matrix, the present patent applicant has succeeded in developing a microvaristor filler that exhibits an extraordinarily low tendency to sediment in the application medium due to its material composition and its consequent low density and in addition has very good nonlinear electrical properties. The composition, preparation and use of this microvaristor filler are described in the patent application WO 2021/105319 A1 by the same patent applicant. The contents of this patent application are hereby incorporated herein in their full scope.

However, in a dielectric polymer matrix comprising them, the microvaristor fillers described in WO 2021/105319 A1 likewise have an E/ρ diagram in which, although the specific resistance of the composite material can be reduced with increasing proportion by weight of microvaristor filler in the polymer matrix, a discharge current simultaneously flows, however, even at a relatively low field strength, which leads to lower electrical strength of the composite material.

The object of the present invention therefore consists in providing a process with the aid of which the insulation properties of varistor-containing composite materials based on dielectric polymers can be adjusted in a variable manner, depending on the application requirements, by means of a small number and low concentration of fillers, where the fillers are homogeneously distributed in the polymer matrix and where the electrical strength of the composite materials is substantially or fully retained.

A further object of the present invention consists in indicating suitable fillers which are suitable for the variable adjustment of the electrical insulation properties of varistor-containing composite materials.

In addition, an additional object of the invention consists in providing composite materials having resistive and capacitive field-control properties whose electrical insulation properties can be adjusted in a variable manner, in accordance with the requirements of the respective application medium, by means of a small number and low concentration of fillers.

The object of the present invention is achieved by a process for the variable adjustment of the electrical insulation properties of varistor-containing composite materials in which one or more mass unit(s) of a dielectric polymer material are provided and in each case a particulate microvaristor filler A and a further particulate filler B in a predefined total mass A+B are added to the mass units, where the particulate filler B either has a lower electrical conductivity than the particulate microvaristor filler A or where the particulate filler B is a semiconductive particulate material having a higher electrical conductivity than that of the particulate microvaristor filler A, and where a mass ratio A:B in the range from 1:99 to 99:1 is in each case set differently in different mass units of the polymer material in the total mass A+B.

Furthermore, the object of the invention is also achieved by the use of a filler mixture for the variable adjustment of the electrical insulation properties of varistor-containing composite materials, where the filler mixture consists of a predefined total mass A+B comprising a particulate microvaristor filler A and a further particulate filler B, the particulate filler B either has a lower electrical conductivity than the particulate microvaristor filler A or the particulate filler B is a semiconductive particulate material having a higher electrical conductivity than the particulate microvaristor filler A, and where a mass ratio A:B in the range from 1:99 to 99:1 exists in the total mass A+B and the filler mixture is added to one or more mass units of a dielectric polymer material and the mass ratio A:B is set identically or differently from one another in each of the mass units.

The object of the invention is likewise achieved by a varistor-containing composite material having resistive and capacitive field-control properties, comprising mass units of a dielectric polymer material and a particulate microvaristor filler A and a further particulate layer B in a predefined total mass A+B in each mass unit of the dielectric polymer material, where the particulate filler B has a lower electrical conductivity than the particulate microvaristor filler A or where the particulate filler B is a semiconductive particulate material having a higher conductivity than the particulate microvaristor filler A, and where the same mass ratio A:B exists in each of the mass units of the polymer material that comprise the particulate fillers A+B and the mass ratio A:B is in the range from 1:99 to 99:1.

Surprisingly, it has been found that the electrical insulation properties of varistor-containing composite materials can be adjusted as needed if the composite material, besides a particulate microvaristor filler (A), also comprises another particulate filler (B) whose electrical conductivity is either greater than the electrical conductivity of the microvaristor filler, but is likewise in the semiconductive range, or whose electrical conductivity is lower than that of the microvaristor filler. If the one or other particulate fillers (B) is employed in a mixture with a particulate microvaristor filler (A) in a dielectric polymer matrix, the specific electrical resistance of the respective composite material can be adjusted as needed without the percentage total filler proportion having to the increased or reduced compared with the sole use of the microvaristor filler. The electrical strength of the composite material thus remains virtually the same, since the switching point of the composite material hardly changes at all compared with the sole use of the microvaristor filler (i.e. a discharge current only flows from a certain field strength).

In order to achieve a homogeneous distribution of the microvaristor filler in the polymer matrix, it is advantageous for the microvaristor filler to have a comparatively low density whose difference from the density of the polymer material comes out as small as possible in order to minimise or prevent sedimentation of the microvaristor filler during preparation of the composite material.

Known microvaristor fillers comprising doped zinc oxide have an extraordinarily high density of 5.5 to 6.5 g/cm 3, depending on the degree of compaction achieved by the sintering process used in their preparation. Since the density of these microvaristor particles is significantly greater than the density of the polymeric application medium, these varistor particles have a great tendency to sediment as early as during preparation of the mixtures with the polymeric application medium, which makes homogeneous and durable mixing of the materials more difficult. The irregular composition of the application medium correspondingly leads to irregularities in its electrical properties.

For this reason, zinc oxide-containing microvaristor fillers are not suitable for use in the process according to the invention.

By contrast, the microvaristor fillers described in the patent application WO 2021/105319 A1 by the same patent applicant that has already been mentioned above have proven particularly suitable for the process according to the invention since they have an only low density in the range from 1.5 to 4.5 g/cm 3 with an average particle size in the range from 1 to 150 μm and can therefore be distributed homogeneously very well in a polymeric matrix. Uniform non-linear electrical properties can thereby be established homogeneously in the corresponding composite materials.

The said microvaristor fillers in accordance with WO 2021/105319 A1 are particulate fillers which consist of support particles and a coating surrounding each of the support particles, where the support particles comprise or in each case consist of at least one aluminium compound or silicon compound and the coating comprises a titanium dioxide doped with niobium and at least one further element.

Particularly suitable aluminium compounds which come into consideration here are aluminium oxide ($Al_2O_3$) or natural and synthetic aluminosilicates of various composition. A particularly suitable silicon compound is silicon dioxide ($SiO_2$), which can be employed in crystalline form and particularly preferably in amorphous form, for example as kieselguhr.

Materials which consist of or comprise aluminosilicates are, for example, mullite, fly ash, kaolinite, pumice stone or perlite. Mullite and fly ash can particularly preferably be employed.

In addition, suitable support materials are those which consist of a mixture of an aluminosilicate with aluminium oxide and/or silicon dioxide.

The support particles for the particulate microvaristor fillers A preferably employed in accordance with the invention can have various shapes. In view of the later application media and their specific requirements, flake-form or spherical support particles are particularly suitable, or alternatively also support particles which have an isotropically irregular shape. The shape of the support particles is also retained after the coating with the doped titanium dioxide.

The density of the particulate microvaristor fillers A employed is in the range from 1.5 to 4.5 g/cm$^3$, preferably in the range from 1.5 to 3.0 g/cm 3 and in particular in the range from 1.5 to 2.5 g/cm$^3$. In the microvaristor fillers described in WO 2021/105319 A1, it is composed of the average of the densities of support particles and coating and can in each case be matched to the requirements in the application medium through the corresponding choice of materials, in particular of the support particles.

The support particles of the particulate microvaristor filler in accordance with WO 2021/105319 A1 are in each case surrounded by a coating which comprises a doped titanium dioxide which is doped with niobium and at least one further element. The coating here surrounds each support particle individually and is in separate form thereon, i.e. does not form a coherent phase around a plurality of support particles.

The further element is at least one element selected from the group consisting of Mn, Cr, Ce, V, Co, Fe, Zn, Sn, Y, Zr, Ta, Ca, Sr and Ba. The doping elements employed are preferably Mn, Cr and Ce.

The doping particularly preferably takes place in the combinations:

Nb, Mn;
Nb, Mn, Cr;
Nb, Mn, Ce;
Nb, Cr;
Nb, Cr, Ce
Nb, Ce; or
Nb, Mn, Cr, Ce, where the combinations Nb, Mn, Ce and Nb, Cr are particularly preferred. The doping elements are in cationic form in the $TiO_2$ crystal lattice or are located at the grain boundaries of the titanium dioxide granules.

The doping in the titanium dioxide is in each case present in an amount of 0.01 to 5 atom-%, based on the number of the sum of Ti atoms and atoms of the doping elements. The proportion of the doping elements (totality of the doping elements) is preferably at a content of 0.02 to 2 atom-%.

The coating on the support particles of the microvaristor filler preferably consists of multi-doped titanium dioxide, which is in the form of granules on the surface of the support particles, where it forms a substantially continuous, granular layer.

The coating on the support particle in each case has a geometrical thickness in the range from 100 to 5000 nm, preferably from 150 to 4000 nm and in particular from 200 to 2000 nm. The geometrical layer thickness of the coating can easily be determined by means of conventional measurement methods (for example SEM) with reference to cross-section images (Ar ion beam) of individual particles of the particulate filler.

The average particle size $d_{50}$ of the particulate microvaristor filler is in the range from 1 to 150 μm, preferably from 2 to 100 μm and in particular 5-50 μm. Due to the origin of the above-mentioned support materials of isotropic shape, the particle sizes of the individual filler particles can vary in a comparatively broad range, meaning that it often only appears sensible to quote the volume-based average particle size $d_{50}$ here. A certain variation latitude of the particle size of the individual particles is generally also present on use of flake-form support particles.

The particle size of the particulate microvaristor filler and, where appropriate, of the support particles is preferably determined via a laser diffraction method, which is generally familiar and has the advantage of also being able to determine the particle size distribution of the particles. For the microvaristor fillers A used here and their support particles in accordance with WO 2021/105319 A1, the particle sizes have been determined using a Malvern Mastersizer 3000, APA 300 (product from Malvern Instruments, Ltd., UK).

Further details regarding the properties and the preparation process of the microvaristor filler A preferably employed in accordance with the invention can be found in the above-mentioned patent application WO 2021/105319 A1, the disclosure content of which is intended to be incorporated herein in its full scope.

Besides the particulate microvaristor filler A, a further particulate filler, denoted by B here, is added to the dielectric polymer material in accordance with the present invention. The particulate filler B can either have higher electrical conductivity or alternatively a lower electrical conductivity than the particulate microvaristor filler A.

In a first embodiment, the particulate filler B has a lower electrical conductivity than the particulate microvaristor filler A. In this case, the specific powder resistance of the particulate filler B is, in accordance with the invention, in the range $\geq 10^{14}$ ohm*cm (at a measurement voltage of 100 V).

Particulate fillers of this type are commonly referred to as dielectric, but can nevertheless lead to a current flow when an electric field having a high electric field strength acts on the matrix material comprising them.

Ceramic materials, for example those comprising aluminosilicates, have proven particularly suitable here for use in the present invention. In the present invention, use is made, in particular, of ceramic microspheres from 3M with the name "3M™ Ceramic Microspheres", which have a density of about 2.4 g/cm$^3$. The latter is in the region of the density of the particulate microvaristor filler A, meaning that a mixture of the two fillers can be distributed well in the polymeric matrix and also no sedimentation of the fillers takes place on the solidification of the composite materials obtained.

Suitable as particulate filler B in the first embodiment are also those fillers which are built up in material terms virtually analogously to the particulate microvaristor filler A described above, but whose electrical conductivity in the coating is set lower than that of the particulate microvaristor filler A through extremely low doping of the titanium dioxide layer with Nb and at least one further doping element, or have no doping at all in the $TiO_2$ layer, and which therefore have a specific powder resistance in the range $\geq 10^{14}$ ohm*cm. The density of these particles essentially corresponds to the density of the particulate microvaristor filler A.

In a second embodiment, the particulate fillers B employed are semiconductive particulate materials which have a specific powder resistance in the range from $10^8$ to $10^{12}$ ohm*cm, where the values indicated refer to a measurement voltage of 100 V. Materials having a specific powder resistance of $10^{10}$ to $10^{12}$ ohm*cm are particularly preferably employed.

For use as particulate fillers B in accordance with the present invention, materials which have a structure of the core/shell type and a density of <5 g/cm$^3$, in particular of <4 g/cm$^3$, have proven particularly preferred. Due to different materials of core and shell, the density of such particles can readily be set in the said range, so that here too a mixture of particulate microvaristor filler A and semiconductive particulate filler B leads neither to significant separation of the two filler components nor to significant sedimentation of these fillers in the polymer matrix. This enables stable electrical properties, here insulation properties, to be obtained in the application medium over the entire body cross section or longitudinal section of the composite material.

In accordance with the invention, it is advantageous to employ particulate fillers B which have an electrically semiconductive, strongly adherent coating consisting of a doped metal oxide on a core of mica or talc particles. The doped metal oxide here is preferably an antimony-doped tin oxide. It is necessary here for the proportion of the doping element antimony in the tin oxide coating to come out sufficiently low that the coated particles obtained are not electrically conductive, but instead are semiconductive. This is achieved if the tin: antimony molar ratio in the coating is merely in the range from 99.99:0.01 to 97:3 and if, if necessary, the doped tin oxide layer on the core particle is also covered on its surface by a further, dielectric, metal oxide layer. The semiconductive particles preferably have a particle size of less than 15 μm.

Suitable semiconductive particulate materials of the structure described are commercially available and are offered, for example, by Merck KGaA, Germany, under the name Iriotec® 7510 or Iriotec® 7550, where the latter is preferably employed in the present invention.

However, suitable as particulate filler B are also fillers that have a material structure analogous to the particulate microvaristor filler A described above, but whose electrical conductivity in the coating is set higher than that of the particulate microvaristor filler A through higher doping of the titanium dioxide layer with Nb and at least one further doping element and which therefore have a specific powder resistance in the range from $10^8$ to $10^{12}$ ohm*cm.

Electrically conductive particulate materials, even if they consist of mica particles which have a coating of electrically conductive, antimony-doped tin dioxide (with a proportion of >3% of antimony), are not suitable for use in the present invention.

The electrical properties of the particulate fillers B are characterised by their specific powder resistance. In order to measure the specific resistance of a pigment powder, an acrylic glass tube having an internal diameter of 2 cm is filled with a small amount of the respective pigment powder (about 0.5 to g) and compressed against a metal electrode using a metal ram with the aid of a weight of 10 kg. The specific resistance p is obtained from the layer thickness L of the compressed powder in accordance with the following equation:

$$\rho = R*\pi*(d/2)^2/L(\text{ohm}*\text{cm})$$

R here represents the electrical resistance actually measured at a measurement voltage of 100 V and d represents the diameter of the pigment column. In the case where a tube having different dimensions is to be employed for the measurement of the specific powder resistance, the values for d and L in the formula must be amended correspondingly.

In accordance with the process according to the invention, the particulate microvaristor filler A and the particulate filler B are added jointly to one or more defined mass unit(s) of a dielectric polymer material.

In accordance with the invention, the dielectric polymer material comprises silicones, polyurethanes, polyethylenes, epoxides or phenolic resins or comprises EPDM. Dielectric polymers of this type are generally customary as polymer matrix for varistor-containing composite materials having non-linear electrical properties.

The mass unit of the dielectric polymer material here is taken to be the mass of dielectric polymer material required in each case for the application, determined in the mass units gram, kilogram, tonne, etc.

A predefined total mass of fillers A+B is added to the respective mass unit of the dielectric polymer material, where the total mass A+B is expressed here in percent by weight and is based on the total weight of the respective mass unit of the dielectric polymer material, including the total mass A+B of the particulate fillers A+B.

The total mass A+B thus represents the mass A+B that corresponds to a certain percentage proportion by weight of fillers in the respective mass unit of the dielectric polymer material provided with fillers. In accordance with the invention, this is in the range from 5 to 35% by weight, preferably in the range from 15 to 30% by weight, in each case based on the total weight of the mass unit of the dielectric polymer material.

If, for example, a total mass of 50 g of a mixture of a particulate microvaristor filler A and a particulate filler B is therefore added to a mass of 150 g of a dielectric polymer material, the total mass A+B, expressed in percent by weight, is 25% by weight here.

Within the total mass A+B, the mass ratio A:B can, in accordance with the invention, be in the range from 1:99 to 99:1. This internal mass ratio of the particulate fillers is in each case determined by the electrically insulating properties that are to be established in the final composite material.

The starting point for specific adaptation of the electrically insulating properties of varistor-containing composite materials is in each case a composite material which comprises a predefined mass of a dielectric polymer material and a likewise defined mass (expressed in % by weight) of the particulate microvaristor filler A. After the respective mixture has been converted into a cylindrical test specimen shape and hardened, the test specimen is transferred into a corresponding device (will be explained below) and an E/ρ characteristic line of the material is drawn up using the measurement results. This shows the specific resistance of the test specimen p as a function of the field strength E of the applied electric field.

This characteristic line can be used to determine the initial specific resistance of the test specimen at a very low field strength of the applied electric field and the switching point that indicates the field strength at which a discharge current starts to flow in the test specimen.

In the case where a certain application requires a higher initial specific resistance than can be obtained by the sole use of the particulate microvaristor filler A, a particulate filler B which has a lower electrical conductivity than the particulate microvaristor filler A is now added in accordance with the invention. The specific powder resistance of a particulate filler B of this type is in the range ≥$10^{14}$ ohm*cm, as described above.

The total mass A+B here corresponds to the mass A employed for the determination of the initial characteristic line. A certain mass proportion of the mass of A originally employed is thus replaced by the same mass of B, so that the total mass of particulate fillers in the polymer matrix does not change compared with the initial measurement. Series of experiments with an increasing mass proportion of particulate filler B in the total mass A+B with a constant mass A+B now enables the desired initial specific resistance of the respective test specimen to be increased, with the switching point being in the same field strength range in the case of all test specimens which comprise a mixture of the particulate fillers A and B in any desired ratio in the range from 1:99 to 99:1. The switching strength of the test specimens is thus retained on addition of a particulate filler B having a lower electrical conductivity than that of the particulate microvaristor filler A, compared with a sole use of the particulate microvaristor filler A in the same dielectric polymer material and with a constant mass proportion of particulate fillers, which determine the electrical insulation properties of the respective composite material.

If the E/ρ characteristic lines of the various test specimens are plotted in a single diagram, each of the mass units of the dielectric polymer material comprising the particulate fillers A and B (here in the test specimen) has an E/ρ characteristic line which lies spatially between an E/ρ characteristic line of a mass unit of the same polymer material which comprises only the particulate microvaristor filler A, and the E/ρ characteristic line of a mass unit of the same polymer material which comprises only the particulate filler B. A corresponding diagram is shown in FIG. 3.

If a higher electrical conductivity and thus a lower specific resistance than can be obtained with the sole use of the microvaristor filler A is required in an application medium, a semiconductive particulate filler B in an amount increasing in each sample are also added to the respective mass unit of the dielectric polymer material in addition to the particulate microvaristor filler A, analogously to the above description. The semiconductive particulate filler B here has a specific powder resistance in the range from $10^8$ to $10^{12}$ ohm*cm, as described above.

By recording and comparing the E/ρ characteristic lines of various test specimens, each having different mass proportions A and B in the total mass A+B, which is constant in all experiments, a composition of a varistor-containing composite material can be found which corresponds exactly to the respective requirements of the application medium. A corresponding diagram is shown in FIG. 4.

Since the internal ratio A:B in the total mass A+B can be controlled individually as required, the specific electrical resistance of a varistor-containing composite material can be adjusted very precisely by the process according to the invention via the mass ratio A:B which gives rise to the desired electrically insulating properties in the application medium, analogously to the test specimen of corresponding composition. In accordance with the invention, electrically insulating properties which have an electrical resistance that is optimal for the respective application medium can be set in varistor-containing composite materials using only a few particulate fillers and a small number of experiments, without the electrical strength of the material being impaired.

The present invention also relates to the use of a filler mixture for the variable adjustment of the electrical insulation properties of varistor-containing composite materials in which the filler mixture consists of a predefined total mass A+B comprising a particulate microvaristor filler A and a further particulate filler B, where the particulate filler B either has a lower electrical conductivity than the particulate microvaristor filler A or where the particulate filler B is a semiconductive particulate material having a higher electrical conductivity than the particulate microvaristor filler A, and where a mass ratio A:B in the range from 1:99 to 99:1 exists in the total mass A+B, where the filler mixture is added to one or more mass units of a dielectric polymer material and an identical or different mass ratio A:B is set in each of the mass units.

Details relating to the material composition and the specific powder resistances of the particulate fillers A and B have already been described above.

If series experiments are undertaken in test specimens in order to determine the optimum material and percentage composition of the particulate fillers as described above, the predefined total mass A+B will be the same in each of the mass units of the dielectric polymer material. Only the ratio A:B will be selected differently in each test specimen and therefore in each of the mass units of the dielectric polymer material. When the optimum composition of the test specimen has been found in this way, a varistor-containing composite material which comprises a dielectric polymer material and a filler mixture comprising components A and B as described above can be produced in accordance with the material composition of the test specimen. In this composite material, which is intended for use as electrically insulating material having nonlinear electrical properties, both the total mass A+B and the ratio A:B is the same in each case, irrespective of how many mass units of the dielectric polymer material components A and B have to be added to individually in order to have available a suitable mass of varistor-containing composite material for the respective application. The total mass of the particulate fillers A+B, expressed in percent by weight, is in each case in the range from 5 to 35% by weight, preferably in the range from 15 to 30% by weight, in each case based on the total weight of the respective mass unit of the dielectric polymer material including the total mass A+B of the particulate fillers A and B.

It goes without saying that the materials already described above for the dielectric polymer materials and for the particulate microvaristor filler A and the particulate fillers B are used here. A more detailed description is therefore not necessary at this point.

The present invention also relates to a varistor-containing composite material having resistive and capacitive field control properties, comprising mass units of a dielectric polymer material and a particulate microvaristor filler A and a further particulate filler B in a predefined total mass A+B in each mass unit of the dielectric polymer material, where the particulate filler B has a lower electrical conductivity than the particulate microvaristor filler A or where the particulate filler B is a semiconductive particulate material having a higher conductivity than the particulate microvaristor filler A, and where the same mass ratio A:B exists in each of the mass units of the polymer material comprising the particulate fillers A+B and the mass ratio A:B is in the range from 1:99 to 99:1.

In this varistor-containing composite material, the total mass A+B in each of the mass units is in the range from 5 to 35% by weight, based on the total weight of the mass units of the dielectric polymer material including the total mass A+B of the particulate fillers A and B.

In accordance with the invention, the dielectric polymer material in this composite material comprises silicones, polyurethanes, polyethylenes, epoxides or phenolic resins having resistively or capacitively field-controlling properties or comprises EPDM.

The type of particulate fillers A and B and the determination of the percentage composition of the filler mixture A+B that is optimum in each case is determined as described above in test specimens using a few series experiments. In accordance with the composition found in this way, a varistor-containing composite material having resistive and capacitive field-control properties is produced which is matched in an optimum manner to the respective application conditions and can be employed in diverse application media.

Areas of use which come into consideration are those in which varistor-containing materials are usually employed, for example field control on high-voltage cables, for the connection of which to one another, for example in muffs or also at terminals, the main insulation is removed and large field-strength gradients (electrical stress) build up at the interfaces of electrically conductive and insulating components or overvoltage protection against transient loads, such as switching voltages, lightning strikes or discharges. Further areas of use are field control of encapsulation compositions and contacts of circuits in high-power electronics. Applications for direct voltage and for alternating voltage are possible.

The present invention provides varistor-containing composite materials which are optimised for the particular application and a process with the aid of which such an optimised composition of the composite materials can be determined. With the aid of a small number of fillers and the dielectric polymer materials usually employed for composite materials of this type, it is possible to obtain varistor-containing composite materials of homogeneous composition which have electrically insulating and at the same time resistively or capacitively field-controlling properties and high electrical strength.

Figure 1:
FIG. 1: shows the diagrammatic circuit of the measurement arrangement (1*b*, bottom) with voltage source (DC), integrated voltage measurement (U), pico-ammeter (A) and test specimen, and the cylindrical test specimen with the relevant dimensions (1*a*, top) for determination of the electrical measurement results for the establishment of an E/ρ characteristic line.
Figure 1:
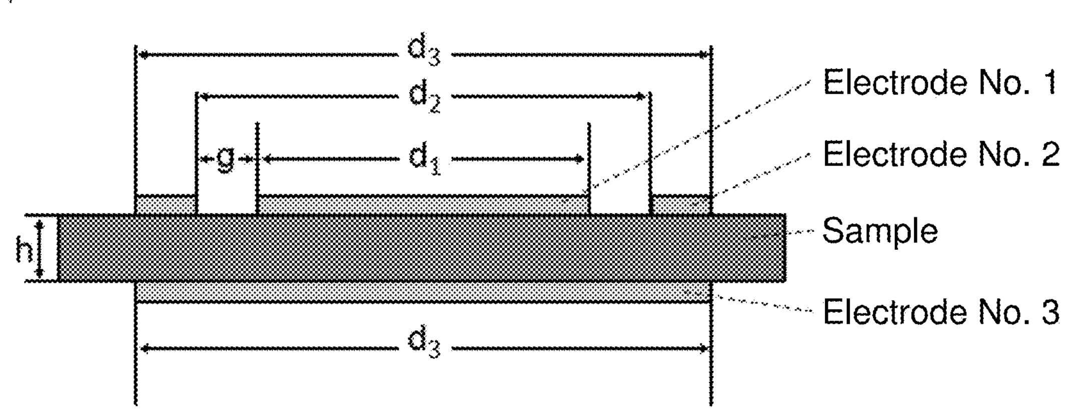
Figure 1:
Figure 1:
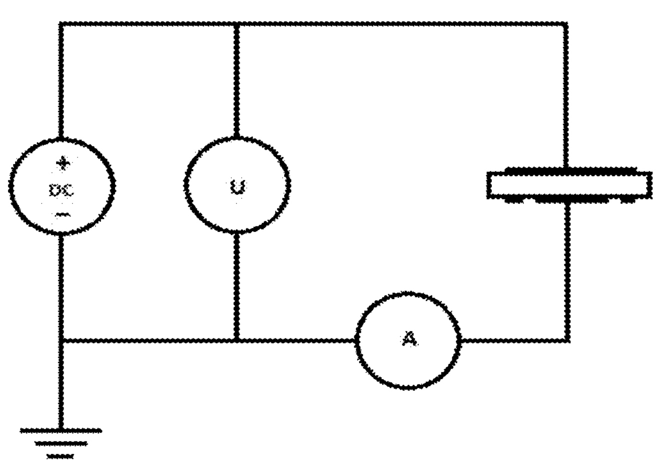

The invention is intended to be described below with reference to examples, but is not intended to be restricted thereto.

EXAMPLES

Preparation of Particulate Fillers

Preparation of a Particulate Microvaristor Filler A:

100 g of spherical aluminosilicate particles (BET 0.50 $m^2/g$ density 2.45 $g/cm^3$, particle size $d_5$-$d_{95}$=1.2 μm-17 μm) are suspended in about 2 l of deionised water. A solution of 599 g of titanium oxychloride (400 g/l), 0.38 g of niobium pentachloride and 0.24 g of potassium chromium sulfate dodecahydrate is added dropwise to the suspension at 75° C. with stirring in an acidic medium. The pH of 2 is kept constant by simultaneous regulated metered addition of sodium hydroxide solution. When the total amount of the solution has been added, the mixture is stirred at 75° C. for a further 15 min. The reaction mixture is subsequently called to room temperature with stirring and adjusted to a pH of 5. The pigment obtained is filtered off via a suction filter, washed with water, dried at 110° C. and calcined at 850° C. for 120 min., giving an ochre-coloured pigment powder. The pigment particles obtained have hollow aluminosilicate spheres (particle size <40 μm) as support particles and a coating comprising niobium- and chromiun-doped titanium dioxide adherently precipitated onto them.

Preparation of a Semiconductive Particulate Filler B Having Increased Electrical Conductivity Compared With the Microvaristor Filler A:

In a 5 l stirred reactor, 100 g of mica having a maximum particle size of <15 μm are suspended in 2 l of deionised water. 590 g of a solution comprising 121 g of $SnCl_4$ and 0.273 g of $SbCl_3$ in hydrochloric acid are metered in at 75° C. with stirring over the course of 2 hours. The pH is kept constant at pH=1.6 by simultaneous metered addition of sodium hydroxide solution. When the addition is complete, a further 10.6 g of 40% by weight titanium oxychloride solution in hydrochloric acid are added at pH=2, and the mixture is stirred at 75° C. for a further half an hour. The pH is subsequently adjusted to 4 using sodium hydroxide solution, and the suspension is cooled to room temperature. The pigment is filtered off, washed with water until salt-free, dried and calcined at 750° C. for 30 minutes, giving 171 g of pigment as a white lustrous powder. The content of antimony in the tin oxide layer is 0.25 mol-%, based on the sum of Sn+Sb. The pigment has a specific powder resistance of about $10^{12}$ ohm*cm (measurement voltage 100 V).

Example 1

Production of Test Specimens With Room Temperature-Crosslinking Silicone as Polymer Component In order to produce a test specimen having a pigment mass concentration of 25%, the particulate microvaristor filler A obtained as above is incorporated into a room temperature-crosslinking silicone resin. In addition, further test specimens, likewise having a total mass concentration of 25%, are produced which, besides the microvaristor filler A, comprise a further filler B which has a lower electrical conductivity than the microvaristor filler A (3M™ Ceramic Microspheres W-210 from 3M, particle size $d_{10}$-$d_{90}$ 2-12 μm). The percentage proportion of A is set to between 25 and 90% and the percentage proportion of B is set, conversely, to between 75 and 10%, in each case based on the total mass A+B.

The particulate fillers are roughly premixed in a can with the respective proportions of component 1 of a commercial room temperature-crosslinking silicone resin RTV-2 (manufacturer's material data: comp. 1:comp. 2=9:1, viscosity of the mixture 3500 mPa*s at 23° C., Shore A hardness 45°) and homogenised in a vacuum SpeedMixer (Hauschild) for at least 2 minutes at a reduced pressure of 4 mbar and 1600 revolutions per minute. The respective amounts of component 2 of the same RTV2 silicone resin are subsequently added, the components are again roughly premixed and homogenised in the vacuum SpeedMixer for at least 1 minute at 4 mbar and 1600 revolutions per minute. The viscous mass is now poured rapidly, while observing the pot life, into a mould, which determines the geometrical dimensions of the test specimen. The silicone resin is cured in the mould at 70° C. for at least 30 minutes. After the mould has cooled, the mould is opened and the test specimen is removed and stored under dust-free conditions. The layer thicknesses of the crosslinked test specimens are between 500 μm and 600 μm and are determined at various points for each of the test specimens (circular base area, diameter 60 mm) as the average of ten measurements using an eddy-current layer thickness measuring instrument (Fischer Dualscope FMP30 with FD10 sensor in accordance with DIN EN ISO 2360).

(Note: The two components of commercial room temperature-crosslinking silicone resins RTV-2 are usually called A and B by the manufacturers. In order to avoid confusion with the particulate filler components according to the present invention, the silicone resin components are by contrast called component 1 and component 2 here).

The pigment mass concentration PMC is defined as follows (the volatile fractions are not included), but is indicated in percentage terms here:

$$PMC = \frac{m(\text{filler})}{m(\text{filler}) + m(\text{binder})}$$

$M$ = mass

Example 2

Test specimens are produced as described in Example 1 from with room temperature-cross-linking silicone as polymer component, but which, besides the particulate microvaristor filler A, also comprise the semiconductive particulate filler B as indicated above in the preparation procedure. The pigment mass concentration is 25% in each case. The percentage proportion of A is set to between 25 and 75% and the percentage proportion of B is set, conversely, to between 75 and 25%, in each case based on the total mass A+B.

Measurement of the Test Specimens With Respect to Their Electrical Properties

The current/voltage characteristics of the varistor filler/polymer test specimens produced are measured using a Heinzinger 10 kV DC voltage source (PNChp 10000-20 ump) and a Kethley pico-ammeter (6514 system electrometer) on a ring electrode in accordance with DIN EN 61340-2-3.

The diagrammatic structure of the measurement apparatus and the test specimen dimensions to be observed are shown by FIG. 1.

In order to standardise the results, the electric field strength E and the current density J are calculated in accordance with formulae (2-4) with the sample and electrode dimensions given in FIG. 1:

$$E=V/h \qquad (2)$$

$$J=I/A \qquad (3)$$

$$A=(d_1+g)^2*\pi/4 \qquad (4)$$

V=voltage in volts (V)

I=current strength in amperes (A)

A=effective electrode area ($m^2$)

h=electrode separation (sample thickness): ~0.5 mm $d_1$-$d_4$=electrode diameters (see FIG. 1)

$d_1$=diameter of central electrode: 25 mm g=separation of ring electrode from central electrode: 2.5 mm The specific resistances p of the test specimens are given by the equation ρ=E/J.

The measurements of the current are carried out using a step-shaped voltage ramp at room temperature and relative atmospheric humidity between 20% and 30%.

Figure 3:
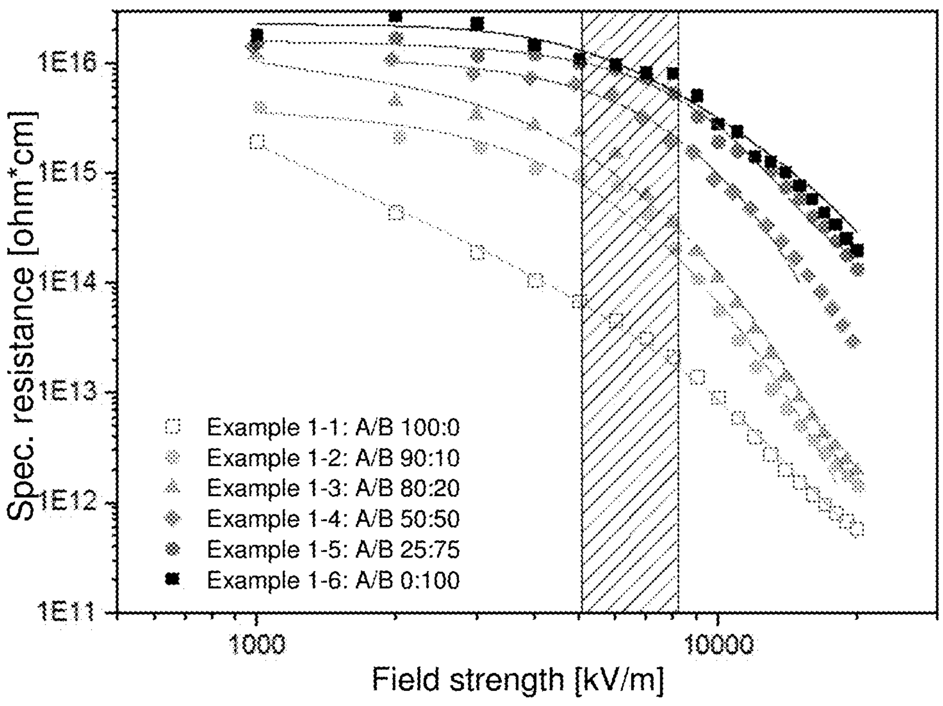
FIG. 3: shows the characteristic DC field strength-specific resistance characteristic line (E/ρ of a filler in accordance with Example 1 of the present invention in RTV-2 silicone with various ratios of the fillers A:B. The ranges for the switching points are highlighted by hatching.
Figure 4:
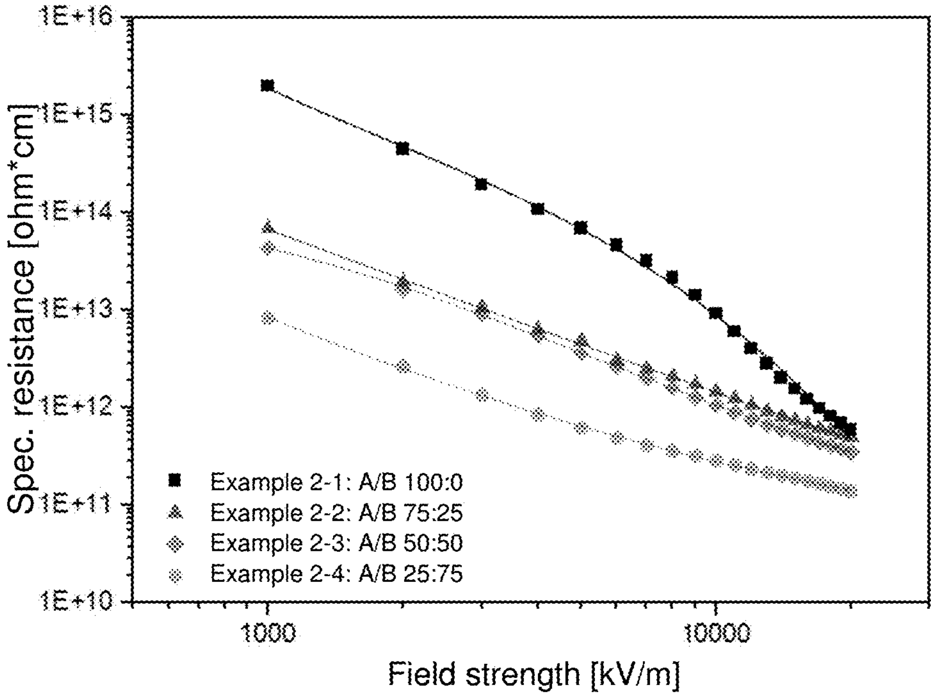
FIG. 4: shows the characteristic DC field strength-specific resistance characteristic line (E/ρ of a filler in accordance with Example 2 of the present invention in RTV-2 silicone with various ratios of the fillers A:B.

Corresponding diagrams of all E/ρ characteristic lines determined are shown in FIGS. 3 (Example 1) and 4 (Example 2).

Figure 2:
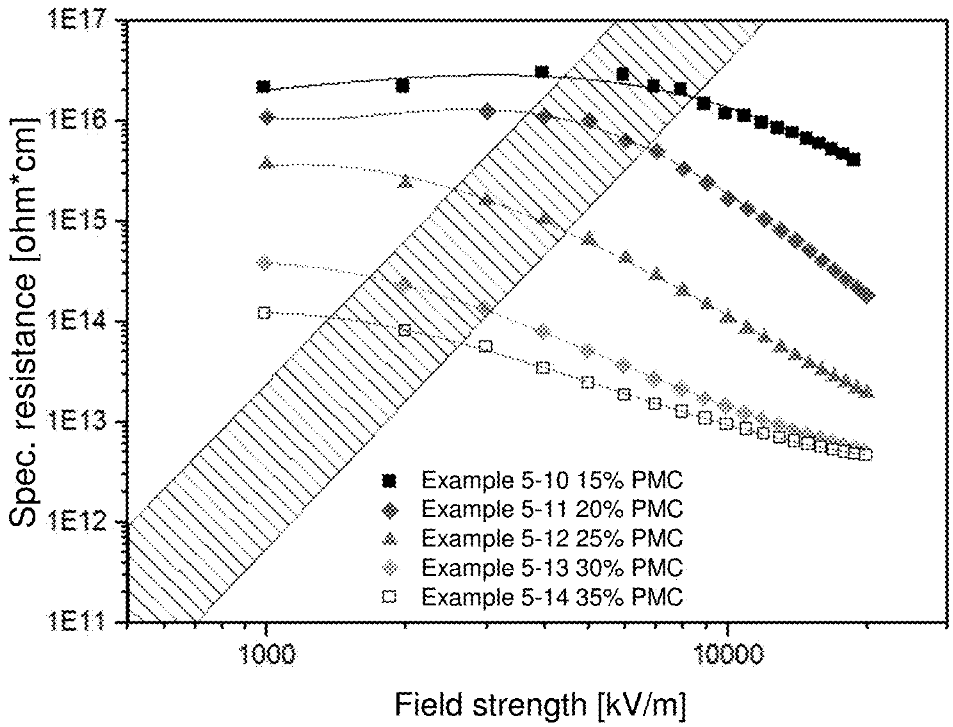
FIG. 2: shows the characteristic DC field strength-specific resistance characteristic line (E/)ρ of a filler in accordance with Examples 5-10 to 5-14 from WO 2021/105319 A1 in RTV-2 silicone with pigment mass concentrations of 15, 20, 25, 30 and 35% by weight. The ranges for the switching points are highlighted by hatching.

For comparison, FIG. 2 shows the diagram of E/p characteristic lines of test specimens comprising silicone resins which only comprise a particulate microvaristor filler A in increasing pigment mass concentration (in accordance with Examples 5-10 to 5-14 from WO 2021/105319 A1).

The invention claimed is:

1. A process for the variable adjustment of the electrical insulation properties of varistor-containing composite materials, comprising providing one or more mass unit(s) of a dielectric polymer material and adding a particulate microvaristor filler A having an average particle size $d_{50}$ of from 1 to 150 μm and a further particulate filler B in a predefined total mass A+B to each of the one or more mass unit(s), where the particulate filler B either has a lower electrical conductivity than the particulate microvaristor filler A or where the particulate filler B is a semiconductive particulate material having a higher electrical conductivity than that of the particulate microvaristor filler A, and where a mass ratio A: B is in the range of from 1:99 to 99:1, and wherein the mass ratio A:B is set differently in different mass units of the polymer material in the total mass A+B, wherein the particulate microvaristor filler A is a filler which consists of support particles and a coating surrounding each of the support particles, where the support particles comprise at least one aluminium compound or silicon compound, and where the coating comprises a titanium dioxide doped with niobium and at least one further element.

2. The process according to claim 1, wherein the total mass A+B, expressed in % by weight, is identical in each of the one or more mass unit(s) of the polymer material, wherein the total mass A+B expressed in % by weight is based on the total weight of a mass unit of the dielectric polymer material including the total mass A+B of the particulate fillers A and B.

3. The process according to claim 2, wherein the total mass A+B is in the range of from 5 to 35% by weight, based on the total weight of a mass unit of the dielectric polymer material including the total mass A+B of the particulate fillers A and B.

4. The process according to claim 1, wherein each mass unit of the dielectric polymer material that comprises the particulate fillers A and B has an E/ρ characteristic line that lies spatially between an E/ρ characteristic line of a mass unit of the same polymer material which only comprises the particulate microvaristor filler A, and the E/ρ characteristic line of a mass unit of the same polymer material which only comprises the particulate filler B.

5. The process according to claim 1, wherein the dielectric polymer material comprises one or more silicones, polyurethanes, polyethylenes, epoxides, phenolic resins and/or ethylene-propylene-diene monomers.

6. The process according to claim 1, wherein the particulate microvaristor filler A is a filler which consists of support particles and a coating surrounding each of the support particles, where the support particles consist of at least one aluminium compound or silicon compound, and where the coating comprises a titanium dioxide doped with niobium and at least one further element.

7. The process according to claim 1, wherein the support particles comprise aluminium oxide, silicon dioxide or an aluminosilicate.

8. The process according to claim 1, wherein the support particles consist of aluminium oxide, silicon dioxide, mullite, fly ash, kaolinite, pumice stone or perlite.

9. The process according to claim 1, wherein the at least one further element is selected from the group consisting of Mn, Cr, Ce, V, Co, Fe, Zn, Sn, Y, Zr, Ta, Ca, Sr and Ba.

10. The process according to claim 9, wherein the at least one further element is selected from the group consisting of Mn, Cr and Ce.

11. The process according to claim 1, wherein the particulate microvaristor filler A has an average particle size in the range of from 5 to 50 μm.

12. The process according to claim 1, wherein the particulate filler B is the semiconductive particulate material which has a higher electrical conductivity than the particulate microvaristor filler A and has a specific powder resistance in the range of from $10^8$ to $10^{12}$ ohm*cm.

13. The process according to claim 1, wherein the particulate filler B has a lower electrical conductivity than the particulate microvaristor filler A and has a specific powder resistance in the range of $\geq 10^{14}$ ohm*cm.

14. A method for the variable adjustment of the electrical insulation properties of varistor-containing composite materials, the method comprising adding a filler mixture to one or more mass units of a dielectric polymer material, wherein the filler mixture consists of a predefined total mass A+B comprising a particulate microvaristor filler A having an average particle size $d_{50}$ of from 1 to 150 μm and a further particulate filler B, where the particulate filler B either has a lower electrical conductivity than the particulate microvaristor filler A or where the particulate filler B is a semiconductive particulate material having a higher electrical conductivity than the particulate microvaristor filler A, and where a mass ratio A:B is in the range of from 1:99 to 99:1 exists in the total mass A+B, and the mass ratio A:B is set identically or differently from one another in each of the one or more mass unit(s);

wherein at least one of the following conditions apply:

the particulate microvaristor filler A is a filler which consists of support particles and a coating surrounding each of the support particles, where the support particles comprise at least one aluminium compound or silicon compound, and where the coating comprises a titanium dioxide doped with niobium and at least one further element;

and/or the particulate filler B is the semiconductive particulate material which has a higher electrical conductivity than the particulate microvaristor filler A and has a specific powder resistance in the range of from $10^8$ to $10^{12}$ ohm*cm.

15. The method according to claim 14, wherein the particulate microvaristor filler A is a filler which consists of support particles and a coating surrounding each of the support particles, where the support particles comprise at least one aluminium compound or silicon compound, and where the coating comprises a titanium dioxide doped with niobium and at least one further element.

16. The method according to claim 14, wherein the particulate filler B is the semiconductive particulate material which has a higher electrical conductivity than the particulate microvaristor filler A and has a specific powder resistance in the range of from $10^8$ to $10^{12}$ ohm*cm.

17. The method according to claim 15, wherein the particulate filler B has a lower electrical conductivity than the particulate microvaristor filler A and has a specific powder resistance in the range of $\geq 10^{14}$ ohm*cm.

18. A varistor-containing composite material having resistive and capacitive field-control properties, comprising mass units of a dielectric polymer material, a particulate microvaristor filler A having an average particle size $d_{50}$ of from 1 to 150 μm and a further particulate filler B in a predefined total mass A+B in each mass unit of the dielectric polymer material, where the particulate filler B has a lower electrical conductivity than the particulate microvaristor filler A or where the particulate filler B is a semiconductive particulate material having a higher conductivity than the particulate microvaristor filler A, and where the same mass ratio A:B exists in each of the mass units of the polymer material that comprise the particulate fillers A+B and the mass ratio A:B is in the range of from 1:99 to 99:1;

wherein at least one of the following conditions apply:

the particulate microvaristor filler A is a filler which consists of support particles and a coating surrounding each of the support particles, where the support particles comprise at least one aluminium compound or silicon compound, and where the coating comprises a titanium dioxide doped with niobium and at least one further element;

and/or particulate filler B is the semiconductive particulate material which has a higher electrical conductivity than the particulate microvaristor filler A and has a specific powder resistance in the range of from $10^8$ to $10^{12}$ ohm*cm.

19. The varistor-containing composite material according to claim 18, wherein the total mass A+B in each of the mass units is in the range of from 5 to 35% by weight, based on the total weight of the mass unit of the dielectric polymer material including the total mass A+B of the particulate fillers A and B.

20. The varistor-containing composite material according to claim 18, wherein the dielectric polymer material comprises one or more silicones, polyurethanes, polyethylenes, epoxides, phenolic resins or ethylene-propylene-diene monomers.

21. A process for the variable adjustment of the electrical insulation properties of varistor-containing composite materials, comprising providing one or more mass unit(s) of a dielectric polymer material and adding a particulate microvaristor filler A having an average particle size $d_{50}$ of from 1 to 150 μm and a further particulate filler B in a predefined total mass A+B to each of the one or more mass unit(s), where the particulate filler B either has a lower electrical conductivity than the particulate microvaristor filler A or where the particulate filler B is a semiconductive particulate material having a higher electrical conductivity than that of the particulate microvaristor filler A, and where a mass ratio A:B is in the range of from 1:99 to 99:1, and wherein the mass ratio A:B is set differently in different mass units of the polymer material in the total mass A+B, wherein the total mass A+B is in the range of from 5 to 35% by weight, based on the total weight of a mass unit of the dielectric polymer material including the total mass A+B of the particulate fillers A and B.

* * * * *